United States Patent [19]
Okumoto et al.

[11] Patent Number: 5,100,144
[45] Date of Patent: Mar. 31, 1992

[54] GOLF CLUB HEAD

[75] Inventors: Takaharu Okumoto, Chigasaki; Tetsuo Hayashi, Hiratsuka, both of Japan

[73] Assignee: The Yokohama Rubber Co., Ltd., Tokyo, Japan

[21] Appl. No.: 668,749

[22] Filed: Mar. 13, 1991

Related U.S. Application Data

[63] Continuation of Ser. No. 428,062, Oct. 27, 1989, abandoned.

Foreign Application Priority Data

Oct. 27, 1988 [JP] Japan .................. 63-269497

[51] Int. Cl.$^5$ .............................. A63B 53/04
[52] U.S. Cl. .................. 273/167 J; 273/DIG. 7; 273/DIG. 23; 273/DIG. 3; 273/DIG. 9
[58] Field of Search .................. 273/167-175, 273/DIG. 7, DIG. 23, 73 F, DIG. 3, DIG. 9; 264/241, 257, 259, 271.1

[56] References Cited

U.S. PATENT DOCUMENTS

| 4,128,963 | 12/1978 | Dano | 273/73 F X |
|---|---|---|---|
| 4,635,941 | 1/1987 | Yoneyama | 273/DIG. 23 X |
| 4,664,383 | 5/1987 | Aizawa | 273/78 |
| 4,687,205 | 8/1987 | Tominaga et al. | 273/169 |
| 4,708,347 | 11/1987 | Kabayashi | 273/171 |
| 4,728,105 | 3/1988 | Kobayashi | 273/169 |
| 4,754,975 | 7/1988 | Aizawa | 273/169 |
| 4,883,623 | 11/1989 | Nagamoto et al. | 273/167 R X |

FOREIGN PATENT DOCUMENTS

| 63-5767 | 1/1988 | Japan | 273/167 R |
|---|---|---|---|
| 63-242287 | 10/1988 | Japan | 273/167 R |

Primary Examiner—Edward M. Coven
Assistant Examiner—Sebastiano Passaniti
Attorney, Agent, or Firm—Finnegan, Henderson, Farabow, Garrett & Dunner

[57] ABSTRACT

A golf club head made of a fiber-reinforced resin, at least the outermost layer of the face thereof being composed of a cloth-reinforcing material impregnated with a matrix resin containing whiskers mixed therein so that the edges of the scoring lines will be composed of the matrix resin containing the whiskers mixed therein.

7 Claims, 2 Drawing Sheets

GOLF CLUB HEAD

This application is a continuation of application Ser. No. 07/428,062 filed Oct. 27, 1989.

BACKGROUND OF THE INVENTION

The present invention relates to a golf club head made of a fiber-reinforced resin, and more particularly, to such a golf club head in which the edges of the scoring lines or punch marks on the face are hardly damaged when a ball is hit with the golf club.

At least the outermost layer of the face of a golf club head made of a fiber-reinforced resin is usually reinforced with a reinforcing cloth material in order to increase the breaking strength of the face when it is used for hitting a ball. The face has grooves parallel to one another which are called 'scoring lines'. The scoring lines are formed by cutting after molding or by molding monolithically with the golf club head. However, when the scoring lines of the golf club head made of the fiber-reinforced resin are formed by the former cutting method, the reinforcing cloth material in the outermost layer is cut to cause delamination. Therefore, the latter molding method in which the scoring lines are formed when the golf club head is molded is preferred in the production of the golf club head made of the fiber-reinforced resin. However, this method also has problems.

Namely, since the reinforcing cloth material has a high rigidity, it is impossible to form it so as to be faithfully fitted along the crossectional shape of the grooves of the scoring lines. A part of the edges of the scoring lines becomes composed of only the matrix resin. In other words, as shown in a crossection of FIG. 4, a relatively large part of the molding of the matrix resin not reinforced with a reinforcing cloth 26 is formed in an edge 27 of a scoring line 24. Therefore, the edge 27 is apt to be broken by an impact applied thereto when a ball is hit. This problem is posed also when punch marks, in the form of holes, are formed in addition to the scoring lines.

SUMMARY OF THE INVENTION

An object of the present invention is to provide a golf club head made of a fiber-reinforced resin the face of which has an improved breaking strength against a force applied thereto when a ball is hit with it.

Another object of the present invention is to provide a golf club head made of a fiber-reinforced resin, the edges of the score lines or punch marks on the face thereof being not broken upon hitting a ball.

The objects of the present invention are attained by a golf club head made of a fiber-reinforced resin having scoring lines on the face thereof, the score lines being formed integrally with the head body when it is molded, characterized in that at least the outermost layer of the face thereof is composed of a reinforcing cloth material impregnated with a matrix resin containing whiskers and the edges of the scoring lines are composed of the matrix resin containing the whiskers.

Since at least the outermost layer of the face is thus reinforced with the reinforcing cloth and also with the whiskers, the breaking strength thereof when hitting a ball is improved. Further since the matrix resin forming the edges of the scoring lines and those of the punch marks is reinforced with the whiskers, they are not broken upon hitting a ball.

DETAILED DESCRIPTION OF THE INVENTION

The reinforcing fibers for the cloth forming the outermost layer of the face in the present invention may be any of the reinforcing fibers ordinarily used for the production of fiber-reinforced resin golf club heads. Preferred examples of them include carbon fibers, glass fibers and aromatic polyamide fibers. The reinforcing cloth material is impregnated with a matrix resin which is a thermosetting resin such as, preferably, a vinyl ester resin, epoxy resin or unsaturated polyester resin. The whiskers to be mixed in the matrix resin are preferably silicon carbide, potassium titanate or the like.

The reinforcing cloth material is impregnated with the matrix resin containing the whiskers to form a prepreg, which is then used for forming the outermost layer of the face. The prepreg is prepared by a process wherein the reinforcing cloth material is impregnated with the matrix resin in which a suitable amount of whiskers is homogeneously dispersed or a process wherein the whiskers are scattered on the surface of the reinforcing cloth material impregnated with the matrix resin and then they are pressed under a roll. The former process is preferred when the amount of the whiskers to be mixed is small and the latter process is preferred when it is large.

The amount of whiskers to be mixed in the matrix resin is 0.5 to 5 parts by volume, preferably 1 to 3 parts by volume, for 100 parts by volume of the matrix resin. When it is less than 0.5, the prevention of the breakage of the edges of the scoring lines or those of the punch marks is difficult. When it is more than 7, on the contrary, the fluidity of the matrix resin is reduced to make the molding difficult.

Figure 1:
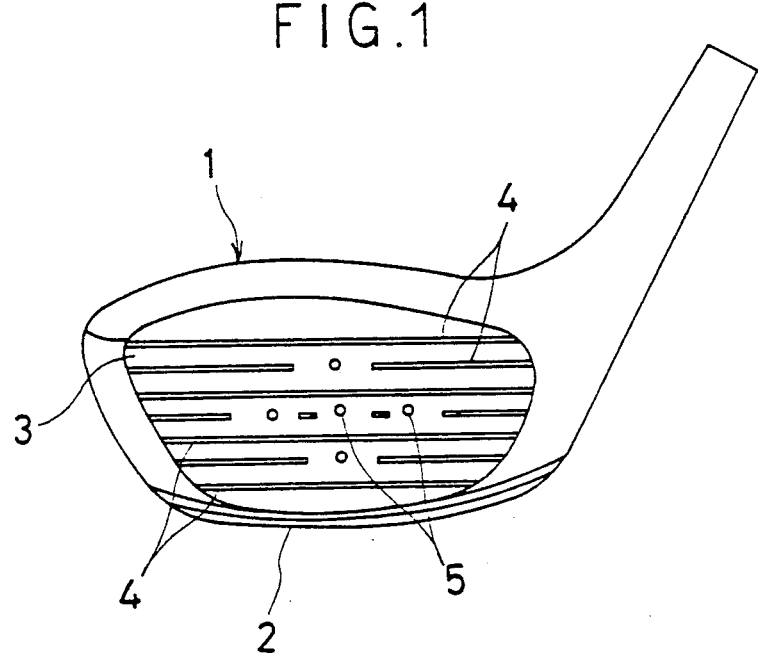
FIG. 1 is a front view of a wooden golf club head prepared in an embodiment of the present invention.

The present invention will be described with reference to the drawings. FIG. 1 shows a wooden-type club head prepared according to an embodiment of the present invention, wherein 1 is a head body made of a fiber-reinforced resin and 2 is a metallic sole formed on the underside of the head body 1. A face 3 is formed on a side of the head body 1. The surface of the face 3 has parallel, horizontal scoring lines 4, i.e., grooves, and punch marks 5, i.e., holes. The punch marks 5 do not necessarily needs to be provided. The scoring lines 4 and punch marks 5 are formed integrally with the head body when the fiber-reinforced resin is molded into the club head.

Figure 2:
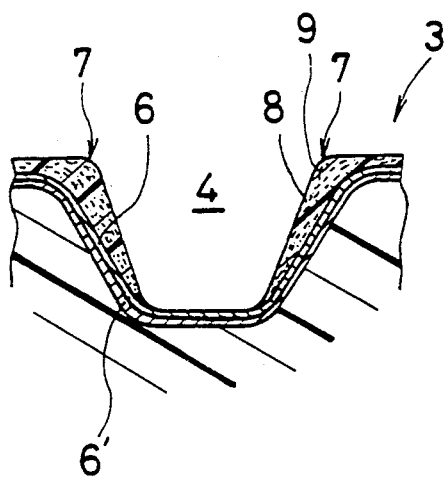
FIG. 2 is an enlarged cross section of a scoring line of the face of the wooden golf club head shown in FIG. 1, cut perpendicularly to the scoring lines.

At least the outermost layer of the face 3 is reinforced with a reinforcing cloth material. The reinforcing cloth material is impregnated with a matrix resin reinforced with whiskers mixed therein. In the cross section of the scoring line 4 of the face 3 in FIG. 2, the reinforcing cloth material 6 of the outermost layer is close to the scoring line 4. However, since the reinforcing cloth material 6 has a high rigidity, it can not be exactly fitted along the crosssectional shape of the groove of the scoring line 4. Thus the edges 7 on either side of the groove consist only of the matrix resin 8. However, the matrix resin 8 is reinforced with whiskers 9 mixed therein. The structure of the punch mark part is the same as that of the scoring line part.

One or more reinforcing cloth material layers 6' may be formed inside the reinforcing cloth material layer 6 or, alternatively, reinforcing fibers may be just arranged there as the reinforcing material in place of the cloth.

Figure 3:
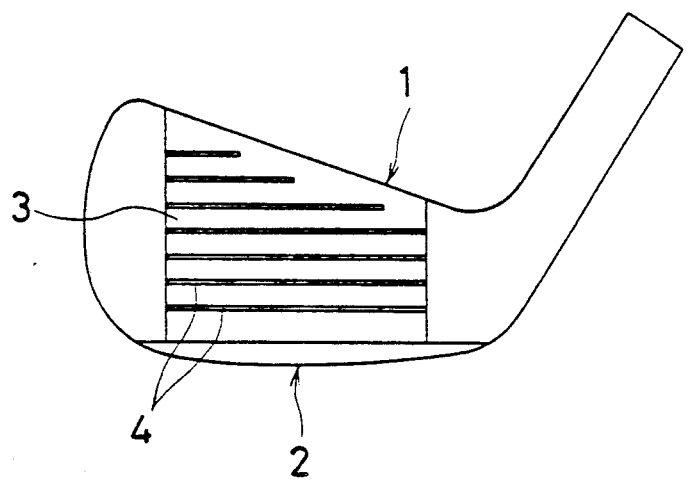
FIG. 3 is a front view of an iron golf club head prepared in another embodiment of the present invention.
Figure 4:
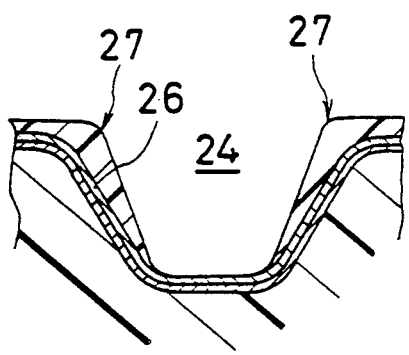
FIG. 4 is an enlarged cross section of a part of an ordinary golf club head corresponding to the part shown in FIG. 2.

The present invention can be applied not only to the above-described wooden-type golf club head but also to an iron golf club head made of a fiber-reinforced resin as shown in FIG. 3. The iron golf club head is composed of a fiber-reinforced resin head body 1 just as the wooden golf club head and a metallic sole 2. A face 3 has scoring lines 4. At least the outermost layer of the face 3 is reinforced with a reinforcing cloth material impregnated with a matrix resin in which whiskers have been mixed. The structure of the crosssectional part of the scoring line 4 is the same as that shown in FIG. 2.

The above-described golf club head of the present invention exhibits an improved breaking strength when a ball is hit with it, since the face thereof is reinforced with the reinforcing cloth material and also with the whiskers. Further, although the edges of the scoring lines or punch marks on the face are not directly reinforced with the reinforcing cloth material, the matrix resin forming the edges is reinforced with the whiskers and, therefore, the edges can be protected from breakage when a ball is hit with the golf club head.

EXAMPLE 1

A vinyl ester resin was mixed with silicon carbide whiskers (TOKAWHISKER, a product of Tokai Carbon Co., Ltd.) to form six kinds of matrix resin having various whisker contents which ranged from 0 to 7 parts by volume for 100 parts by volume of the matrix resin. Carbon fiber cloths were impregnated with the six matrix resins, respectively, so that the volume ratio of the carbon fibers to the matrix resin would be 40:100 to form six reinforcing materials.

A synthetic foam composed of glass balloons and a vinyl ester resin was used for forming a core. The core was covered with a sheet molding compound comprising carbon fibers in a vinyl ester resin matrix and also with a prepreg of carbon fibers in a vinyl ester resin matrix. One of the above-described six reinforcing materials was applied to the face to form a laminate composed of two layers. It was placed in a compression mold together with a sole plate and molded under heating to form a wooden club head. Thus six wooden club heads were molded.

The wooden club heads were abraded, painted and finished to produce six wooden golf clubs.

Ceramic balls having the same size as golf balls were continuously hit with the six wooden golf club heads at a head speed of 35 m/sec by means of "shot robot" (a product of Miyamae Kabushiki Kaisha) and then the degree of breakage of the edges of the scoring lines on the face was examined.

The breakage of the wooden club head and moldability in the step of molding the head were as shown in Table 1.

In Table 1, the following criteria were adopted:
X: poor
Δ: fair
○: good
⊙: very good

TABLE 1

| Sample No. | Amount of whiskers mixed | Moldability | Breakage of edges |
| --- | --- | --- | --- |
| 1 | 0 | ○ | X |
| 2 | 0.5 | ○ | ○ |
| 3 | 1 | ○ | ⊙ |
| 4 | 3 | ○ | ⊙ |
| 5 | 5 | ○ | ○ |
| 6 | 7 | Δ | ○ |

It is apparent from Table 1 that the golf club heads produced by using 0.5 to 5 parts by volume of the whiskers for 100 parts by volume of the matrix resin have a good moldability and a high resistance to edge breakage.

EXAMPLE 2

Wooden club heads were produced in the same manner as that of Example 1 except that the silicon carbide whiskers were replaced with potassium titanate whiskers (TISMO-D 104, a product of Otsuka Chemical Co., Ltd.) and that the amount of the whiskers was 0.5, 1 or 3 parts by volume for 100 parts by volume of the matrix resin.

Wooden golf clubs were produced using the three wooden club heads. The same tests as those of Example 1 were conducted. The results of the tests and the moldability in the step of molding into the wooden golf club heads were as shown in Table 2.

TABLE 2

| Sample No. | Amount of whiskers mixed | Moldability | Breakage of edges |
| --- | --- | --- | --- |
| 7 | 0 | ○ | X |
| 8 | 0.5 | ○ | ⊙ |
| 9 | 1 | ○ | ⊙ |

What is claimed is:

1. In a golf club head having a head body made from a molded fiber-reinforced resin, said head body having a front face containing a plurality of spaced narrow grooves forming scoring lines, said grooves being formed integrally with the head body when it is molded and having a bottom portion spaced inwardly from the front face, two side walls and spaced, opposed upper edges on either side thereof where the side walls of the grooves meet the front face, the outermost layer of the face of the head body comprising a reinforcing cloth material impregnated with a matrix resin, said cloth material lying adjacent the face of the club in the areas between the grooves and in the bottom portion of the grooves but being spaced inwardly therefrom in the areas of the side walls and edges of the grooves whereby said resin alone forms the side walls and edges of the grooves, the improvement wherein said matrix resin contains whiskers in an amount of from 0.5 to 5 parts by volume per 100 parts by volume of the matrix resin so that said side walls and edges of the grooves will be formed of said matrix resin containing the whiskers.

2. The golf club head of claim 1, wherein the amount of the whiskers is from 1 to 3 parts by volume per 100 parts by volume of the matrix resin.

3. The golf club head of claim 1, wherein the matrix resin is a thermosetting resin selected from the group consisting of vinyl ester resins, epoxy resins and unsaturated polyester resins.

4. The golf club head of claim 1, wherein the whiskers are selected from the group consisting of silicon carbide whiskers and potassium titanate whiskers.

5. The golf club head of claim 1, wherein the cloth material is made from fibers selected from the group consisting of carbon fibers, glass fibers and aromatic polyamide fibers.

6. The golf club head of claim 1, which is in the shape of a wooden golf club head.

7. The golf club head of claim 1, which is in the shape of an iron golf club head.

* * * * *